US012625454B2

(12) United States Patent
Nguyen

(10) Patent No.: US 12,625,454 B2
(45) Date of Patent: May 12, 2026

(54) SHEET CONVEYING DEVICE, IMAGE PROCESSING APPARATUS, AND DRIVE CONTROL METHOD CAPABLE OF SUPPRESSING TEMPERATURE RISE OF MOTOR WITH SIMPLE CONFIGURATION

(71) Applicant: KYOCERA Document Solutions Inc., Osaka (JP)

(72) Inventor: Tung Son Nguyen, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 19/049,887

(22) Filed: Feb. 10, 2025

(65) Prior Publication Data

US 2025/0284235 A1 Sep. 11, 2025

(30) Foreign Application Priority Data

Mar. 6, 2024 (JP) ................................ 2024-033454

(51) Int. Cl.
*G03G 15/00* (2006.01)

(52) U.S. Cl.
CPC .................. *G03G 15/6529* (2013.01); *G03G 2215/00679* (2013.01)

(58) Field of Classification Search
CPC .................. G03G 15/629; G03G 2215/00679
See application file for complete search history.

(56) References Cited

U.S. PATENT DOCUMENTS

| | | | | |
|---|---|---|---|---|
| 8,523,177 | B2 * | 9/2013 | Sakai | B65H 7/02 271/259 |
| 2013/0194341 | A1 | 8/2013 | Ishizuka et al. | |
| 2020/0189867 | A1 * | 6/2020 | Kawai | G03G 15/231 |
| 2020/0204046 | A1 * | 6/2020 | Yamada | H02P 6/08 |
| 2022/0076086 | A1 * | 3/2022 | Kinouchi | G03G 15/55 |

FOREIGN PATENT DOCUMENTS

| | | |
|---|---|---|
| JP | 2013155009 A | 8/2013 |

* cited by examiner

*Primary Examiner* — David H Banh
(74) *Attorney, Agent, or Firm* — Alleman Hall LLP

(57) ABSTRACT

A sheet conveying device includes a motor, a first determination processing portion, and a first restriction processing portion. The motor is used to convey a sheet. The first determination processing portion determines, each time a predetermined determination timing arrives during drive of the motor, whether or not a total drive time of the motor in a predetermined determination period up to the arrival of the determination timing exceeds a predetermined first time. The first restriction processing portion restricts the drive of the motor when the first determination processing portion determines that the total drive time exceeds the first time.

4 Claims, 4 Drawing Sheets

SHEET CONVEYING DEVICE, IMAGE PROCESSING APPARATUS, AND DRIVE CONTROL METHOD CAPABLE OF SUPPRESSING TEMPERATURE RISE OF MOTOR WITH SIMPLE CONFIGURATION

INCORPORATION BY REFERENCE

This application is based upon and claims the benefit of priority from the corresponding Japanese Patent Application No. 2024-033454 filed on Mar. 6, 2024, the entire contents of which are incorporated herein by reference.

BACKGROUND

The present disclosure relates to a sheet conveying device, an image processing apparatus, and a drive control method.

There is known an image processing apparatus including an image reading portion for reading an image of a document sheet and a document sheet conveying portion for conveying a document sheet whose image is read by the image reading portion. In addition, an image processing apparatus capable of suppressing a temperature rise of a motor for driving the document sheet conveying portion is known as a related art.

SUMMARY

A sheet conveying device according to one aspect of the present disclosure includes a motor, a first determination processing portion, a first restriction processing portion, a second determination processing portion, and a second restriction processing portion. The motor is used to convey a sheet. The first determination processing portion determines, each time a predetermined determination timing arrives during drive of the motor, whether or not a total drive time of the motor in a predetermined determination period up to the arrival of the determination timing exceeds a predetermined first time. The first restriction processing portion restricts the drive of the motor when the first determination processing portion determines that the total drive time exceeds the first time. The second determination processing portion determines whether or not an elapsed time from start of the drive of the motor immediately before a reference time at which the drive of the motor is started to the reference time exceeds a length of the determination period. The second restriction processing portion restricts the drive of the motor when the second determination processing portion determines that the elapsed time exceeds the length of the determination period and a time of the drive of the motor from the reference time exceeds a second time that is shorter than the first time.

An image processing apparatus according to another aspect of the present disclosure includes the sheet conveying device and an image reading portion. The image reading portion reads an image of the sheet conveyed by the sheet conveying device.

A drive control method according to another aspect of the present disclosure is performed in a sheet conveying device including a motor used to convey a sheet, and includes a first determination step, a first restriction step, a second determination step, and a second restriction step. In the first determination step, each time a predetermined determination timing arrives during drive of the motor, it is determined whether or not a total drive time of the motor in a predetermined determination period up to the arrival of the determination timing exceeds a predetermined first time. In the first restriction step, the drive of the motor is restricted when it is determined in the first determination step that the total drive time exceeds the first time. In the second determination step, it is determined whether or not an elapsed time from start of the drive of the motor immediately before a reference time at which the drive of the motor is started to the reference time exceeds a length of the determination period. In the second restriction step, the drive of the motor is restricted when it is determined in the second determination step that the elapsed time exceeds the length of the determination period and a time of the drive of the motor from the reference time exceeds a second time that is shorter than the first time.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, an embodiment of the present disclosure will be described with reference to the accompanying drawings. It is noted that the following embodiment is an example of embodying the present disclosure and does not limit the technical scope of the present disclosure.

Configuration of Image Forming Apparatus 100

First, a configuration of an image forming apparatus 100 according to the embodiment of the present disclosure will be described with reference to FIG. 1.

The image forming apparatus 100 is a multifunction peripheral having a plurality of functions such as a facsimile function and a copy function in addition to a scan function for reading an image from a document sheet and a print function for forming an image based on image data. The image forming apparatus 100 is an example of the image processing apparatus of the present disclosure. It is noted that the image processing apparatus of the present disclosure may be a scanner, a printer, a facsimile machine, a copier, or the like.

Figure 1:
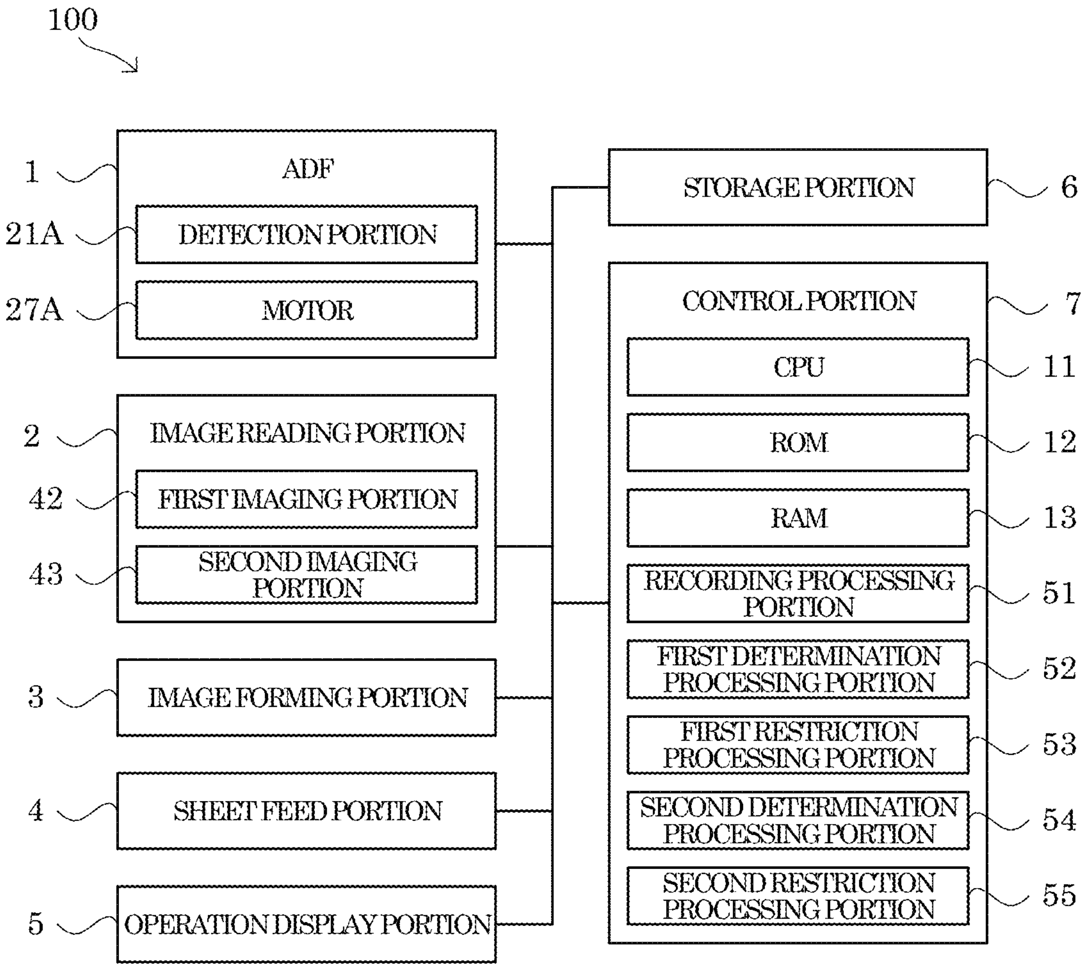
FIG. 1 is a block diagram showing a system configuration of an image forming apparatus according to an embodiment of the present disclosure.

As shown in FIG. 1, the image forming apparatus 100 includes an auto document feeder (ADF) 1, an image reading portion 2, an image forming portion 3, a sheet feed portion 4, an operation display portion 5, a storage portion 6, and a control portion 7.

The ADF 1 conveys a document sheet to be read (an example of the sheet of the present disclosure). The ADF 1 executes conveying processing by the driving force supplied from a motor 27A in accordance with a control instruction from the control portion 7.

The image reading portion 2 reads an image of a document sheet conveyed by the ADF 1. In addition, the image reading portion 2 reads an image of a document sheet placed on a document sheet table 41 (see FIG. 2).

The image forming portion 3 forms an image on a sheet supplied from the sheet feed portion 4, using electrophotographic method. For example, the image forming portion 3 includes a photoconductor drum, a charging roller, a laser scanning unit, a developing device, a transfer roller, a cleaning device, a fixing device, and a sheet discharge tray.

The sheet feed portion 4 supplies a sheet to the image forming portion 3. For example, the sheet feed portion 4 includes a sheet feed cassette, a manual feed tray, a sheet conveying path, and a plurality of conveying rollers.

The operation display portion 5 is a user interface of the image forming apparatus 100. For example, the operation display portion 5 includes a display portion such as a liquid crystal display that displays various types of information in response to control instructions from the control portion 7, and an operation portion such as operation keys or a touch panel that inputs various types of information to the control portion 7 in response to user operations.

The storage portion 6 is a nonvolatile storage device. For example, the storage portion 6 is a storage device such as a flash memory or other nonvolatile memory, a solid state drive (SSD), or a hard disk drive (HDD).

The control portion 7 performs overall control of the image forming apparatus 100. As shown in FIG. 1, the control portion 7 includes a CPU 11, a ROM 12, and a RAM 13. The CPU 11 is a processor that executes various types of arithmetic processing. The ROM 12 is a nonvolatile storage device in which information such as control programs for causing the CPU 11 to execute various types of processing are stored in advance. The RAM 13 is a volatile or non-volatile storage device used as a temporary storage memory (work area) for various types of processing executed by the CPU 11. In the control portion 7, various control programs stored in the ROM 12 in advance are executed by the CPU 11. The control portion 7 thereby performs overall control of the image forming apparatus 100.

Configurations of ADF 1 and Image Reading Portion 2

Next, configurations of the ADF 1 and the image reading portion 2 will be described with reference to FIG. 1 and FIG. 2. Here, FIG. 2 is a cross-sectional view showing the configurations of the ADF 1 and the image reading portion 2.

Figure 2:
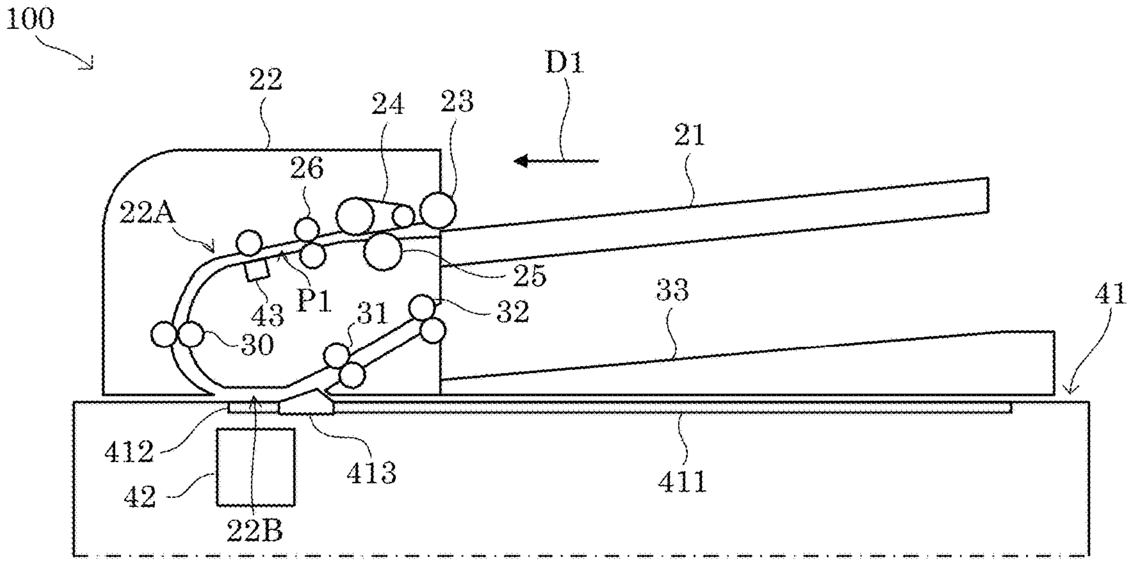
FIG. 2 is a diagram showing configurations of an ADF and an image reading portion of the image forming apparatus according to the embodiment of the present disclosure.

As shown in FIG. 2, the ADF 1 includes a document sheet mounting portion 21, a housing 22, a pickup roller 23, a sheet feed belt 24, a separation roller 25, a registration roller 26, a motor 27A, a first conveying roller 30, a second conveying roller 31, a discharge roller 32, and a discharge portion 33.

A document sheet to be conveyed is placed on the document sheet mounting portion 21. In the ADF 1, the document sheet placed on the document sheet mounting portion 21 is conveyed in a conveying direction D1 shown in FIG. 2.

The document sheet mounting portion 21 is provided with a detection portion 21A shown in FIG. 1. The detection portion 21A detects the presence or absence of a document sheet on the document sheet mounting portion 21. For example, the detection portion 21A is a reflective optical sensor provided on a document sheet mounting surface of the document sheet mounting portion 21.

The document sheet mounting portion 21 is provided with a lift plate (not shown). The lift plate lifts a document sheet stack placed on the document sheet mounting portion 21 to a position where the document sheet stack comes into contact with the pickup roller 23.

The housing 22 houses a roller or the like used to convey a document sheet. As shown in FIG. 2, a conveying path 22A for guiding a document sheet is formed inside the housing 22.

In the ADF 1, the document sheet placed on the document sheet mounting portion 21 is conveyed to the discharge portion 33 through the conveying path 22A.

As shown in FIG. 2, an opening 22B is provided at the bottom of the housing 22. The opening 22B exposes a part of the conveying path 22A to the outside. In the opening 22B, a first imaging portion 42 (see FIG. 1 and FIG. 2) of the image reading portion 2 reads the image of the document sheet conveyed by the ADF 1.

The pickup roller 23 is provided above the document sheet mounting portion 21. The pickup roller 23 comes into contact with the surface (upper surface) of the uppermost document sheet in the document sheet stack lifted by the lift plate, and conveys the document sheet in the conveying direction D1.

The sheet feed belt 24 is provided on the conveying path 22A. The sheet feed belt 24 comes into contact with the surface of the document sheet conveyed in the conveying direction D1 by the pickup roller 23, and conveys the document sheet downstream in the conveying direction D1.

The separation roller 25 is provided below the sheet feed belt 24 in contact with the sheet feed belt 24. The separation roller 25 separates a document sheet that is in contact with the sheet feed belt 24 from the document sheet below it among a plurality of document sheets conveyed to a contact position with the sheet feed belt 24.

The registration roller 26 is provided downstream of the sheet feed belt 24 in the conveying direction D1 on the conveying path 22A. The registration roller 26 comes into contact with the document sheet conveyed by the sheet feed belt 24, and conveys the document sheet downstream in the conveying direction D1.

The first conveying roller 30 is provided downstream of the registration roller 26 in the conveying direction D1 on the conveying path 22A. The first conveying roller 30 comes into contact with a document sheet and conveys the document sheet downstream in the conveying direction D1.

An opening 22B is formed downstream of the first conveying roller 30 in the conveying direction D1 on the conveying path 22A. At the opening 22B, the image of the document sheet passing through the opening 22B is read by the first imaging portion 42 (see FIG. 1 and FIG. 2) of the image reading portion 2.

The second conveying roller 31 is provided downstream of the opening 22B in the conveying direction D1 on the conveying path 22A. The second conveying roller 31 comes into contact with a document sheet conveyed by the first conveying roller 30, and conveys the document sheet downstream in the conveying direction D1.

The discharge roller 32 is provided downstream of the second conveying roller 31 in the conveying direction D1 on the conveying path 22A. The discharge roller 32 comes into contact with a document sheet conveyed by the second conveying roller 31 and discharges the document sheet to the discharge portion 33. Document sheets discharged by the discharge roller 32 is stacked on the discharge portion 33.

As shown in FIG. 1 and FIG. 2, the image reading portion 2 includes a document sheet table 41, a first imaging portion 42, and a second imaging portion 43.

A document sheet to be read is placed on the document sheet table 41. The document sheet table 41 is provided at the top of the housing of the image forming apparatus 100. The ADF 1 is provided so as to be openable and closable with respect to the document sheet table 41, and also serves as a document sheet cover for covering one surface of the document sheet placed on a first contact glass 411 of the document sheet table 41.

As shown in FIG. 2, the document sheet table 41 includes a first contact glass 411, a second contact glass 412, and a guide member 413. A document sheet whose image is to be read by the first imaging portion 42 is placed on the first contact glass 411. When the ADF 1 is closed with respect to the document sheet table 41, the second contact glass 412 and the guide member 413 face the opening 22B of the housing 22 to form a part of the conveying path 22A. The second contact glass 412 transmits light emitted from the first imaging portion 42 toward the opening 22B and light reflected by the document sheet. The guide member 413 guides the document sheet to the second conveying roller 31 downstream of the second contact glass 412 in the conveying direction D1.

The first imaging portion 42 is provided below the first contact glass 411 and the second contact glass 412. The first imaging portion 42 is long in the depth direction of the paper surface in FIG. 2, and is provided so as to be movable in the left-right direction of the paper surface in FIG. 2. The first imaging portion 42 reads an image of the front surface of the document sheet conveyed by the ADF 1 in a state where it is disposed below the second contact glass 412. Specifically, the first imaging portion 42 includes a contact image sensor (CIS) and a housing that houses the CIS. The first imaging portion 42 outputs an analog signal corresponding to the image read from the front surface of the document sheet. The analog signal output from the first imaging portion 42 is converted into a digital signal (image data) by an analog front-end circuit (not shown), and is input to the control portion 7.

The second imaging portion 43 is provided downstream of the registration roller 26 in the conveying direction D1 and upstream of the first conveying roller 30 in the conveying direction D1 on the conveying path 22A. The second imaging portion 43 reads an image of the back surface of the document sheet conveyed by the registration roller 26. Specifically, the second imaging portion 43 is a CIS. The second imaging portion 43 outputs an analog signal corresponding to the image read from the back surface of the document sheet. The analog signal output from the second imaging portion 43 is converted into a digital signal (image data) by the analog front-end circuit, and is input to the control portion 7.

The ADF 1 operates by receiving a driving force supplied from a motor 27A shown in FIG. 1. That is, the motor 27A is used to convey a sheet. The motor 27A outputs the driving force to the ADF 1 in accordance with a control instruction from the control portion 7. In addition, the motor 27A is set to an ON state and an OFF state in accordance with a control instruction from the control portion 7.

By the way, when the motor 27A is continuously driven (operated) for a long time, the temperature of the motor 27A may rise, leading to a failure. Here, an image processing apparatus capable of suppressing the temperature rise of the motor 27A is known as a related art.

However, in the image processing apparatus according to the related art, the drive of the motor 27A is controlled based on the prediction result of the temperature of the motor 27A. Therefore, a configuration for predicting the temperature of the motor 27A is required, which makes the configuration for suppressing the temperature rise of the motor 27A more complicated.

On the other hand, in the image forming apparatus 100 according to the embodiment of the present disclosure, as will be described below, the temperature rise of the motor 27A can be suppressed with a simple configuration.

Configuration of Control Portion 7

Next, the configuration of the control portion 7 will be described in more detail below with reference to FIG. 1. As shown in FIG. 1, the control portion 7 includes a recording processing portion 51, a first determination processing portion 52, a first restriction processing portion 53, a second determination processing portion 54, and a second restriction processing portion 55.

Specifically, a drive control program for causing the CPU 11 to execute drive control processing (see FIG. 6) to be described later is stored in the ROM 12 in advance. By executing the drive control programs stored in the ROM 12, the control portion 7 functions as the processing portions described above. Here, the device including the ADF 1 and the control portion 7 is an example of the sheet conveying device of the present disclosure.

It is noted that the drive control programs may be recorded on a computer-readable recording medium such as a CD, a DVD, or a flash memory, and may be read from the recording medium and stored in a storage device such as the storage portion 6. In addition, some or all of the processing portions included in the control portion 7 may be constituted by electronic circuits. In addition, the drive control programs may be programs for causing a plurality of processors to function as the processing portions included in the control portion 7.

The recording processing portion 51 records a change in the drive state of the motor 27A.

For example, when the drive of the motor 27A is started (changed from the OFF state to the ON state), the recording processing portion 51 records the drive start time of the motor 27A. Specifically, the recording processing portion 51 stores information indicating the drive start time of the motor 27A in a predetermined storage area of the storage portion 6.

When the drive of the motor 27A is ended (changed from the ON state to the OFF state), the recording processing portion 51 records the drive end time of the motor 27A. Specifically, the recording processing portion 51 stores information indicating the drive end time of the motor 27A in the storage area of the storage portion 6.

It is noted that the recording processing portion 51 may determine the current drive state of the motor 27A in a predetermined recording cycle, and store information indicating the determination result in the storage area of the storage portion 6.

Figure 3:
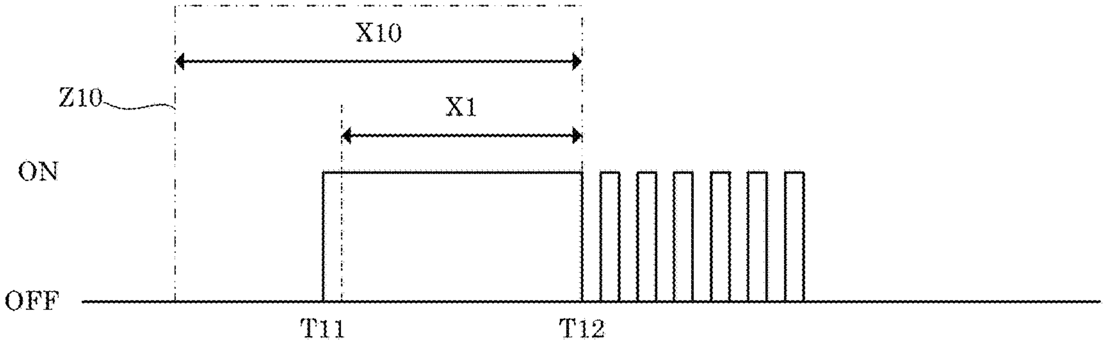
FIG. 3 is a timing chart showing an example of a change with time in the drive state of the motor of the image forming apparatus according to the embodiment of the present disclosure.

Each time a predetermined determination timing arrives during the drive of the motor 27A, the first determination processing portion 52 determines whether or not the total drive time of the motor 27A in a predetermined determination period Z10 (see FIG. 3) up to the arrival of the determination timing exceeds a predetermined first time X1 (see FIG. 3). It is noted that the determination period Z10 is indicated by a dash-dot-dot-dash line in FIG. 3.

For example, the determination timing is a timing that comes every 10 seconds from the start of the drive of the motor 27A. It is noted that the determination timing may be any timing that comes periodically or irregularly during the drive of the motor 27A.

In addition, the determination period Z10 has a length X10 (see FIG. 3) of 28 minutes.

In addition, the first time X1 is 18.2 minutes.

For example, when the determination timing arrives, the first determination processing portion 52 acquires the total drive time of the motor 27A in the determination period Z10 based on the recording result of the recording processing portion 51. Then, the first determination processing portion 52 determines whether or not the acquired total drive time of the motor 27A exceeds the first time X1.

For example, it is assumed that the motor 27A is driven as shown in FIG. 3 before the determination timing T12 shown in FIG. 3. In this case, the first determination processing portion 52 acquires the elapsed time from the drive start timing T11 to the determination timing T12 as the total drive time of the motor 27A in the determination period Z10. Then, the first determination processing portion 52 determines that the acquired total drive time of the motor 27A exceeds the first time X1.

When the continuous drive time exceeds 18.2 minutes, the motor 27A shifts to an abnormal state in which the temperature of the motor 27A exceeds a predetermined upper limit temperature. When the motor 27A is driven in the abnormal state, the risk of failure of the motor 27A increases. In addition, when the motor 27A is driven in the abnormal state, problems such as the motor 27A igniting, or members around the motor 27A being deformed due to heat generated by the motor 27A occur. Therefore, in the image forming apparatus 100, the first time X1 is set to 18.2 minutes.

The first restriction processing portion 53 restricts the drive of the motor 27A when the first determination processing portion 52 determines that the total drive time of the motor 27A in the determination period Z10 exceeds the first time X1.

For example, the first restriction processing portion 53 switches the document sheet conveying mode of the ADF 1 from a normal conveying mode to a low-speed conveying mode in which the number of conveyed document sheets per minute is smaller than that in the normal conveying mode. In the normal conveying mode, a plurality of document sheets are continuously conveyed without the motor 27A being stopped. On the other hand, in the low-speed conveying mode, the motor 27A is stopped for a certain period of time each time a document sheet is conveyed. In other words, the motor 27A is intermittently driven (see FIG. 3). For example, in the low-speed conveying mode, the motor 27A is stopped for four seconds each time a document sheet reaches the first conveying roller 30 (see FIG. 2). Thus, the temperature rise of the motor 27A caused by the continuous drive of the motor 27A is suppressed.

In addition, when the conveying mode is shifted to the low-speed conveying mode, the first restriction processing portion 53 determines whether or not the total drive time of the motor 27A in the determination period Z10 is equal to or less than a third time (for example, 16.2 minutes), which is shorter than the first time X1, every time the determination timing arrives. When it is determined that the total drive time of the motor 27A in the determination period Z10 is equal to or less than the third time, the first restriction processing portion 53 switches the conveying mode from the low-speed conveying mode to the normal conveying mode. In other words, the first restriction processing portion 53 lifts the restriction of the drive of the motor 27A. When the low-speed conveying mode continues for more than a predetermined time (for example, 10 minutes), the first restriction processing portion 53 switches the conveying mode from the low-speed conveying mode to the normal conveying mode.

It is noted that, when the first determination processing portion 52 determines that the total drive time of the motor 27A in the determination period Z10 exceeds the first time X1, the first restriction processing portion 53 may stop the motor 27A for a predetermined time instead of switching the conveying mode to the low-speed conveying mode.

Figure 4:
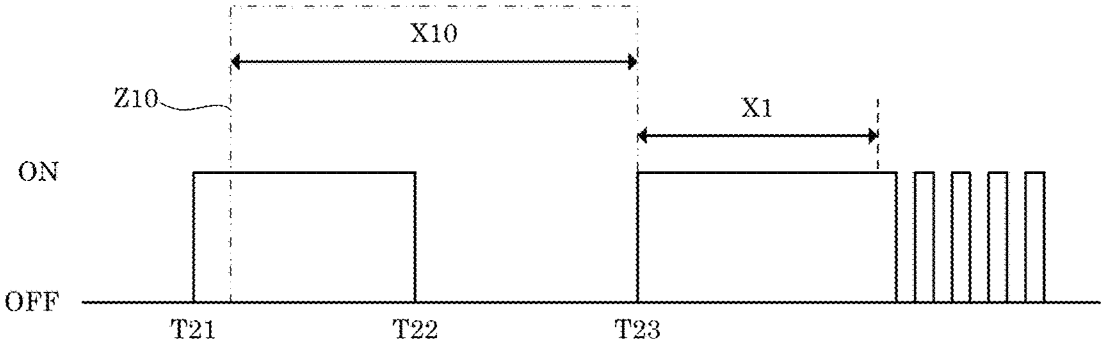
FIG. 4 is a timing chart showing an example of a change with time in the drive state of the motor of the image forming apparatus according to the embodiment of the present disclosure.

It is now assumed that the motor 27A is driven as shown in FIG. 4 before the drive start timing T23 shown in FIG. 4. In this case, when the drive time of the motor 27A from the drive start timing T23 included in the determination period Z10 increases, the drive time of the motor 27A up to the drive end timing T22 included in the determination period Z10 decreases by the same amount as the increase. Therefore, the drive of the motor 27A is not restricted until the continuous drive time of the motor 27A from the drive start timing T23 exceeds the first time X1.

However, at the drive start timing T23, the motor 27A may not have cooled to the temperature of the installation environment of the image forming apparatus 100. That is, the heat generated during the immediately preceding drive period of the motor 27A (the period from the drive start timing T21 to the drive end timing T22) may remain. In this case, if the drive of the motor 27A is not restricted until the continuous drive time of the motor 27A from the drive start timing T23 exceeds the first time X1, the motor 27A shifts to the abnormal state before the continuous drive time of the motor 27A from the drive start timing T23 reaches the first time X1, and the risk of failure of the motor 27A increases.

On the other hand, in the image forming apparatus 100 according to the embodiment of the present disclosure, as will be described below, the risk of failure of the motor 27A can be reduced.

The second determination processing portion 54 determines whether or not the elapsed time from the start of the drive of the motor 27A immediately before the reference time at which the drive of the motor 27A is started to the reference time exceeds the length X10 of the determination period Z10. The reference time is when the motor 27A starts to be driven.

For example, it is assumed that the motor 27A is driven as shown in FIG. 4 until the drive start timing T23 shown in FIG. 4. In this case, the second determination processing portion 54 determines that the elapsed time from the start of the drive of the motor 27A immediately before the drive start timing T23, which is the reference time (the elapsed time from the drive start timing T21 to the drive start timing T23) exceeds the length X10 of the determination period Z10.

Figure 5:
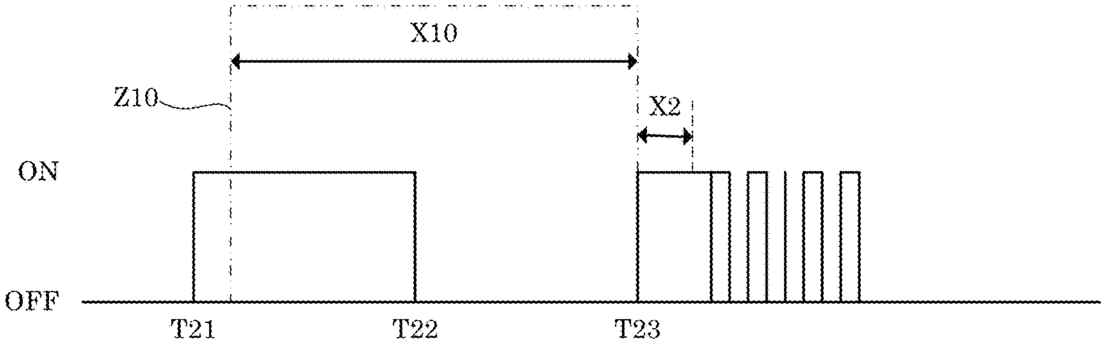
FIG. 5 is a timing chart showing an example of a change with time in the drive state of the motor of the image forming apparatus according to the embodiment of the present disclosure.

The second restriction processing portion 55 restricts the drive of the motor 27A when the second determination processing portion 54 determines that the elapsed time from the start of the drive of the motor 27A immediately before the reference time to the reference time exceeds the length X10 of the determination period Z10 and the drive time of the motor 27A from the reference time exceeds a second time X2 (see FIG. 5), which is shorter than the first time X1.

For example, the second time X2 is set based on the difference between the length X10 of the determination period Z10 and the stop time of the motor 27A up to the reference time, and the first time X1. For example, the second time X2 is obtained by subtracting the difference between the length X10 of the determination period Z10 and the stop time of the motor 27A up to the reference time (the elapsed time from the drive end timing T22 to the drive start timing T23) from the first time X1 (see FIG. 4). By setting the second time X2 as described above, the second time X2 can be set in consideration of the elapsed time (natural cooling time of the motor 27A) from the end of the drive of the motor 27A immediately before the reference time.

It is noted that the second time X2 may be a time obtained by multiplying the first time X1 by a predetermined coefficient (for example, 0.5).

Drive Control Processing

Figure 6:
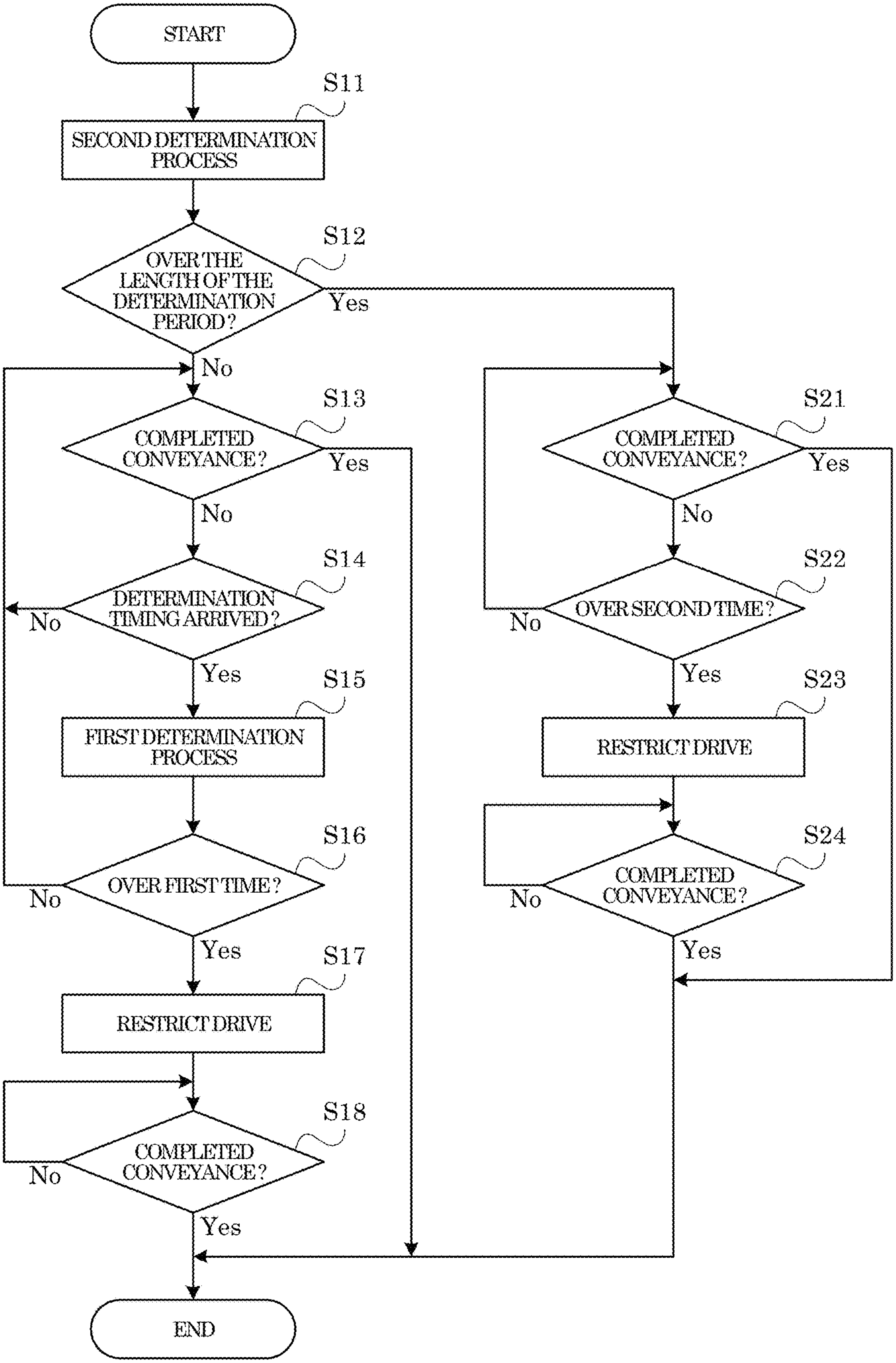
FIG. 6 is a flowchart showing an example of drive control processing executed in the image forming apparatus according to the embodiment of the present disclosure.

The drive control method of the present disclosure will be described below with reference to FIG. 6, along with an example of the procedure of the drive control processing executed by the control portion 7 in the image forming apparatus 100. Here, steps S11, S12, . . . represent the numbers of the processing procedure (steps) executed by the control portion 7. It is noted that, when the conveyance of a document sheet by the ADF 1 (the conveying processing) is started, the drive control processing is executed together with the conveying processing.

It is noted that the change in the drive state of the motor 27A during the execution of the conveying processing is recorded by the recording processing portion 51 of the control portion 7.

Step S11

First, in step S11, the control portion 7 executes a second determination process of determining whether or not the elapsed time from the start of the drive of the motor 27A immediately before the reference time at which the drive of the motor 27A is first started during the execution of the conveying processing to the reference time exceeds the length X10 of the determination period Z10. The process of step S11 is an example of the second determination step of the present disclosure, and is executed by the second determination processing portion 54 of the control portion 7.

Specifically, the control portion 7 executes the second determination process based on the recording result of the change in the drive state of the motor 27A by the recording processing portion 51.

Step S12

In step S12, the control portion 7 branches the processing in accordance with the result of the second determination process. Specifically, when it is determined in the second determination process that the elapsed time from the start of the drive of the motor 27A immediately before the reference time exceeds the length X10 of the determination period Z10 (Yes in S12), the control portion 7 shifts the processing to step S21. In addition, when it is determined in the second determination process that the elapsed time from the start of the drive of the motor 27A immediately before the reference time does not exceed the length X10 of the determination period Z10 (No in S12), the control portion 7 shifts the processing to step S13.

Step S13

In step S13, the control portion 7 determines whether or not the conveying processing has been completed.

Here, when the control portion 7 determines that the conveying processing has been completed (Yes in S13), the control portion 7 terminates the drive control processing. In addition, when the conveying processing has not been completed (No in S13), the control portion 7 shifts the processing to step S14.

Step S14

In step S14, the control portion 7 determines whether or not the determination timing has arrived.

Specifically, the control portion 7 determines that the determination timing has arrived when 10 seconds have elapsed since the last arrival of the determination timing (or the reference time).

Here, when the control portion 7 determines that the determination timing has arrived (Yes in S14), the control portion 7 shifts the processing to step S15. In addition, when the determination timing has not arrived (No in S14), the control portion 7 shifts the processing to step S13.

Step S15

In step S15, the control portion 7 executes a first determination process of determining whether or not the total drive time of the motor 27A in the determination period Z10 up to the last arrival of the determination timing exceeds the first time X1. The process of step S15 is an example of the first determination step of the present disclosure, and is executed by the first determination processing portion 52 of the control portion 7.

Specifically, the control portion 7 executes the first determination process based on the recording result of the change in the drive state of the motor 27A by the recording processing portion 51.

Step S16

In step S16, the control portion 7 branches the processing in accordance with the result of the first determination process. Specifically, when it is determined in the first determination process that the total drive time of the motor 27A in the determination period Z10 up to the last arrival of the determination timing exceeds the first time X1 (Yes in S16), the control portion 7 shifts the processing to step S17. When it is determined in the first determination process that the total drive time of the motor 27A in the determination period Z10 up to the last arrival of the determination timing does not exceed the first time X1 (No in S16), the control portion 7 shifts the processing to step S13.

Step S17

In step S17, the control portion 7 restricts the drive of the motor 27A. The process of step S17 is an example of the first restriction step of the present disclosure, and is executed by the first restriction processing portion 53 of the control portion 7.

Specifically, the control portion 7 switches the conveying mode of the document sheet at the ADF 1 from the normal conveying mode to the low-speed conveying mode.

Step S18

In step S18, the control portion 7 determines whether or not the conveying processing has been completed.

Here, when the control portion 7 determines that the conveying processing has been completed (Yes in S18), the control portion 7 terminates the drive control processing. In addition, when the conveying processing has not been completed (No in S18), the control portion 7 waits for the conveying processing to be completed in step S18.

It is noted that the control portion 7 may lift the restriction on the drive of the motor 27A when the total drive time of the motor 27A in the determination period Z10 decreases to the third time or less or when the low-speed conveying mode continues beyond a predetermined time while waiting for the completion of the conveying processing.

Step S21

In step S21, the control portion 7 determines whether or not the conveying processing has been completed.

Here, when the control portion 7 determines that the conveying processing has been completed (Yes in S21), the control portion 7 terminates the drive control processing. In addition, when the conveying processing has not been completed (No in S21), the control portion 7 shifts the processing to step S22.

Step S22

In step S22, the control portion 7 determines whether or not the drive time of the motor 27A from the reference time exceeds the second time X2.

Here, when it is determined that the drive time of the motor 27A from the reference time exceeds the second time X2 (Yes in S22), the control portion 7 shifts the processing to step S23. When the drive time of the motor 27A from the reference time does not exceed the second time X2 (No in S22), the control portion 7 shifts the processing to step S21.

Step S23

In step S23, the control portion 7 restricts the drive of the motor 27A as in step S17. Here, the process of step S23 is an example of the second restriction step of the present disclosure, and is executed by the second restriction processing portion 55 of the control portion 7.

Step S24

In step S24, the control portion 7 determines whether or not the conveying processing has been completed.

Here, when the control portion 7 determines that the conveying processing has been completed (Yes in S24), the control portion 7 terminates the drive control processing. In addition, when the conveying processing has not been completed (No in S24), the control portion 7 waits for the conveying processing to be completed in step S24.

It is noted that the control portion 7 may lift the restriction on the drive of the motor 27A when the total drive time of the motor 27A in the determination period Z10 decreases to the third time or less or when the low-speed conveying mode continues beyond a predetermined time while waiting for the completion of the conveying processing.

As described above, in the image forming apparatus 100, the drive of the motor 27A is controlled based on the total drive time of the motor 27A in the determination period Z10. As a result, it is possible to suppress the temperature rise of the motor 27A with a simpler configuration than the configuration in which the drive of the motor 27A is controlled based on the predicted temperature of the motor 27A.

Appendixes of Invention

The following are appendixes to the overview of the invention extracted from the above embodiment. It is noted that the structures and processing functions to be described in the following appendixes can be selected and combined arbitrarily.

Appendix 1

A sheet conveying device comprising: a motor used to convey a sheet; a first determination processing portion configured to determine, each time a predetermined determination timing arrives during drive of the motor, whether or not a total drive time of the motor in a predetermined determination period up to the arrival of the determination timing exceeds a predetermined first time; a first restriction processing portion configured to restrict the drive of the motor when the first determination processing portion determines that the total drive time exceeds the first time; a second determination processing portion configured to determine whether or not an elapsed time from start of the drive of the motor immediately before a reference time at which the drive of the motor is started to the reference time exceeds a length of the determination period; and a second restriction processing portion configured to restrict the drive of the motor when the second determination processing portion determines that the elapsed time exceeds the length of the determination period and a time of the drive of the motor from the reference time exceeds a second time that is shorter than the first time.

Appendix 2

The sheet conveying device according to Appendix 1, wherein the second time is set based on a difference between the length of the determination period and a stop time of the motor up to the reference time, and the first time.

Appendix 3

An image processing apparatus comprising: the sheet conveying device according to Appendix 1 or 2; and an image reading portion configured to read an image of the sheet conveyed by the sheet conveying device.

Appendix 4

A drive control method executed in a sheet conveying device including a motor used to convey a sheet, comprising: a first determination step of determining, each time a predetermined determination timing arrives during drive of the motor, whether or not a total drive time of the motor in a predetermined determination period up to the arrival of the determination timing exceeds a predetermined first time; a first restriction step of restricting the drive of the motor when it is determined in the first determination step that the total drive time exceeds the first time; a second determination step of determining whether or not an elapsed time from start of the drive of the motor immediately before a reference time at which the drive of the motor is started to the reference time exceeds a length of the determination period; and a second restriction step of restricting the drive of the motor when it is determined in the second determination step that the elapsed time exceeds the length of the determination period and a time of the drive of the motor from the reference time exceeds a second time that is shorter than the first time.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A sheet conveying device comprising:

a motor used to convey a sheet;

a first determination processing portion configured to determine, each time a predetermined determination timing arrives during drive of the motor, whether or not a total drive time of the motor in a predetermined determination period up to the arrival of the determination timing exceeds a predetermined first time;

a first restriction processing portion configured to restrict the drive of the motor when the first determination processing portion determines that the total drive time exceeds the first time;

a second determination processing portion configured to determine whether or not an elapsed time from start of the drive of the motor immediately before a reference time at which the drive of the motor is started to the reference time exceeds a length of the determination period; and a second restriction processing portion configured to restrict the drive of the motor when the second determination processing portion determines that the elapsed time exceeds the length of the determination period and a time of the drive of the motor from the reference time exceeds a second time that is shorter than the first time, wherein the first restriction processing portion switches, when the first determination processing portion determines that the total drive time exceeds the first time, a conveying mode of the sheet from a normal conveying mode in which the motor is continuously driven to a low-speed conveying mode in which the motor is intermittently driven, the first restriction processing portion determines, when the conveying mode is shifted to the low-speed conveying mode, whether or not the total drive time of the motor in the determination period is equal to or less than a third time, which is shorter than the first time, every time the determination timing arrives, and the first restriction processing portion switches, when it is determined that the total drive time is equal to or less than the third time, the conveying mode from the low-speed conveying mode to the normal conveying mode.

2. The sheet conveying device according to claim 1, wherein the second time is set based on a difference between the length of the determination period and a stop time of the motor up to the reference time, and the first time.

3. An image processing apparatus comprising:

the sheet conveying device according to claim 1; and an image reading portion configured to read an image of the sheet conveyed by the sheet conveying device.

4. A drive control method executed in a sheet conveying device including a motor used to convey a sheet, comprising:

a first determination step of determining, each time a predetermined determination timing arrives during drive of the motor, whether or not a total drive time of the motor in a predetermined determination period up to the arrival of the determination timing exceeds a predetermined first time;

a first restriction step of restricting the drive of the motor when it is determined in the first determination step that the total drive time exceeds the first time;

a second determination step of determining whether or not an elapsed time from start of the drive of the motor immediately before a reference time at which the drive of the motor is started to the reference time exceeds a length of the determination period; and a second restriction step of restricting the drive of the motor when it is determined in the second determination step that the elapsed time exceeds the length of the determination period and a time of the drive of the motor from the reference time exceeds a second time that is shorter than the first time, wherein in the first restriction step, when the first determination step determines that the total drive time exceeds the first time, a conveying mode of the sheet is switched from a normal conveying mode in which the motor is continuously driven to a low-speed conveying mode in which the motor is intermittently driven, in the first restriction step, when the conveying mode is shifted to the low-speed conveying mode, whether or not the total drive time of the motor in the determination period is equal to or less than a third time, which is shorter than the first time, is determined every time the determination timing arrives, and in the first restriction step, when it is determined that the total drive time is equal to or less than the third time, the conveying mode is switched from the low-speed conveying mode to the normal conveying mode.

* * * * *